Feb. 21, 1961 A. H. BRADEN 2,972,334
WILDLIFE FEEDER
Filed Oct. 12, 1959
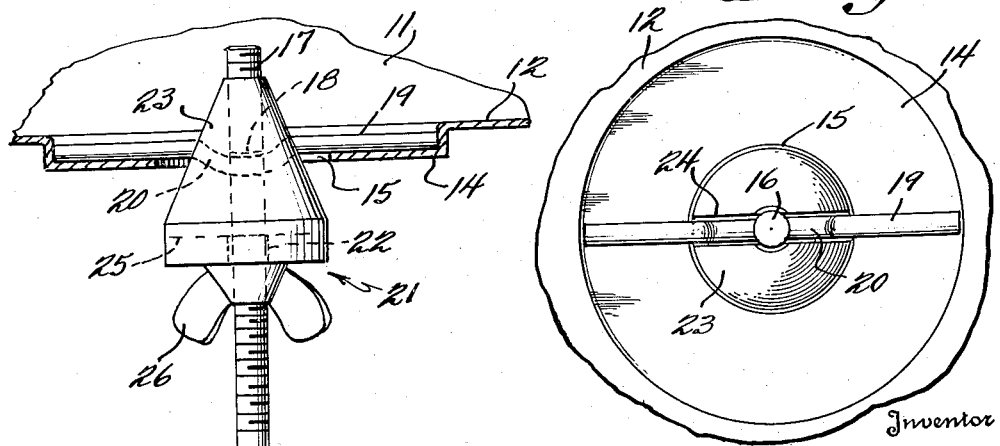

United States Patent Office 2,972,334
Patented Feb. 21, 1961

2,972,334
WILDLIFE FEEDER
Alvin H. Braden, 130 Haverhill Drive, San Antonio, Tex.
Filed Oct. 12, 1959, Ser. No. 845,864
3 Claims. (Cl. 119—51)

The present invention relates to a wildlife feeder and particularly to a feeder which will dispense dry grain when actuated by a breeze blowing against means associated with the feeder.

The primary object of the invention is to provide a dry grain dispenser having means on said dispenser to dispense a limited quantity of grain, and to provide for thus feeding birds, fish, animals, and all kinds of wildlife.

Another object of the invention is to provide a wildlife feeder of the class described above in which means are provided for adjusting the rate of discharge of the grain in order that waste may be eliminated.

Another object of the invention is to provide a feeder or grain dispenser of the class described above which is inexpensive to manufacture, simple to fill and adjust, and which will provide feed therebelow.

Other objects and advantages will become apparent in the following specification when considered in light of the attached drawings, in which:

Figure 1 is a perspective view of the invention shown mounted for use;

Figure 2 is an enlarged fragmentary vertical sectional view of the dispensing valve; and Figure 3 is a top plan view of the structure illustrated in Figure 2.

Referring now to the drawings in detail wherein like reference characters indicate like parts throughout the several figures, the reference numeral 10 indicates generally a feeder or grain dispenser constructed in accordance with the invention.

The feeder 10 includes a container 11 having a bottom wall 12 and is supported by a bail 13 secured to the upper portion of the container 11. The container 11 may have a conventional removable lid (not shown) to maintain the contents of the container 11 protected from the weather and to permit the container 11 to be readily filled.

The bottom wall 12 of the container 11 has a circular recess 14 formed therein having a central axial bore 15 or opening therethrough.

A vertical shaft 16 or pendulum rod, extends through the bore 15 centrally thereof and has threads 17 formed on the upper end portion thereof. The shaft 16 has a transverse bore 18 extending therethrough adjacent the upper end thereof. A pivot pin 19 is supported in the recess 14 and extends through the bore 18 mounting the shaft 16 to the bottom wall 12. The pivot pin 19 has an arcuately offset central portion 20 arranged in depending relation with the shaft 16 supported centrally thereon maintaining the central position of the shaft 16 with respect to the bore 15. A conical valve plug, or adjusting cone, generally indicated at 21, has an axial bore 22 through which the shaft 16 extends and is provided with an upwardly and inwardly tapering conical face 23 arranged in axial alignment with the shaft 16. A slot 24 extends vertically downwardly into the valve plug 21, terminating at 25 adjacent the lower end thereof. A wing nut 26 is threaded on to the shaft 16 and provides means for adjusting the valve plug 21 vertically with respect to the bore 15 so that the space between the valve plug 21 and the bore 15 may be varied as required.

The pivot pin 19 extends transversely through the slot 24 so that the valve plug 21 can move vertically with respect to the slot 24.

The shaft 16 is adapted to have brush or the like, as indicated at 27, or other natural material secured thereto in depending relation to the container 11 so that a breeze blowing against the brush will oscillate the pendulum rod 16, causing the valve plug 21 to swing from side to side about the axis of the pivot pin 19 so as to permit dry material to flow out of the container 11 onto the ground therebeneath.

The feeder 10 is activated by the breeze blowing the brush and moving the pendulum back and forth, thereby agitating the grain and allowing it to be dispensed. The feeder 10 should be suspended with a clearance under the brush pendulum so that it cannot be reached or disturbed by game or live stock that may be in the area. When you have assembled and located the feeder 10 fill the container 11, then place the lid on, fitting it smoothly so that the wind will not blow it off. The feeder 10 may be suspended in any manner convenient. It may be hung on a limb or by the use of a light rope thrown over a limb as shown in Figure 1. Raising and lowering the feeder 10 with this rope makes it easy to refill. It should be raised as near its anchor point as possible, thereby steadying it for better operation of the pendulum. The feeder 10 will dispense any kind of dry grain such as shelled corn, hygeria or prepared pellets. A mixture of grains may also be dispensed. Raising or lowering the control cone 21 with the winged nut 26 adjusts the opening to properly dispense the different sizes of grain. This also controls the amount of grain it will dispense. It is not intended for the grain to flow continuously, only a few grains at a time until the pendulum is moved and shifts more grains into place.

Having thus described the preferred embodiment of the invention, it should be understood that numerous structural modifications and adaptations may be resorted to without departing from the scope of the appended claims.

What is claimed is:

1. An animal feeder comprising a container having a bottom wall, means for suspending said container, said bottom wall being formed with a circular central opening, a shaft having a threaded upper end portion and a depending portion extending axially through said opening, a pivot pin having an arcuate offset portion extending transversely through a bore in the threaded end of said shaft and resting on said bottom wall supporting said shaft in depending relation to said container for swinging movement with respect to said bottom wall, a conical valve plug having a reduced end portion, and having an axial bore formed therein slidingly received upon said threaded end portion of said shaft for vertical adjustment and nut means on said shaft below and supporting said plug for adjusting said valve plug vertically on said shaft to vary the space between the edges of said plug and the edge of the opening in said bottom wall.

2. The structure of claim 1 wherein the reduced end of said valve plug is provided with a transverse slot passing through the bore of said valve plug, to receive said pin.

3. The structure of claim 1 wherein a wind responsive member is secured to the end of said depending portion and adapted to oscillate said rod under wind action to oscillate said valve plug to release feed from said container to fall on the ground.

References Cited in the file of this patent
UNITED STATES PATENTS

| 1,080,133 | Zimmer | Dec. 2, 1913 |
| 1,498,220 | Winkler | June 17, 1924 |
| 2,807,235 | Piel | Sept. 24, 1957 |

FOREIGN PATENTS

| 250,875 | Great Britain | Apr. 22, 1926 |